(12) United States Patent
Fischer et al.

(10) Patent No.: US 6,790,030 B2
(45) Date of Patent: Sep. 14, 2004

(54) MULTI-STAGE COMBUSTION USING NITROGEN-ENRICHED AIR

(75) Inventors: Larry E. Fischer, Los Gatos, CA (US); Brian L. Anderson, Lodi, CA (US)

(73) Assignee: The Regents of the University of California, Oakland, CA (US)

(*) Notice: Subject to any disclaimer, the term of this patent is extended or adjusted under 35 U.S.C. 154(b) by 21 days.

(21) Appl. No.: 10/295,501

(22) Filed: Nov. 14, 2002

(65) Prior Publication Data

US 2003/0152879 A1 Aug. 14, 2003

Related U.S. Application Data

(60) Provisional application No. 60/332,234, filed on Nov. 20, 2001.

(51) Int. Cl.[7] ................................................ F23C 5/00
(52) U.S. Cl. .............................................. 431/8; 431/4
(58) Field of Search ............................ 431/8, 4, 2, 350

(56) References Cited

U.S. PATENT DOCUMENTS

| | | | |
|---|---|---|---|
| 4,496,306 A | | 1/1985 | Okigami et al. |
| 4,806,136 A | | 2/1989 | Kiersz et al. |
| 4,910,957 A | * | 3/1990 | Moreno et al. ............... 60/773 |
| 5,002,483 A | | 3/1991 | Becker |
| 5,526,641 A | | 6/1996 | Sekar et al. |
| 5,649,517 A | | 7/1997 | Poola et al. |
| 6,089,855 A | | 7/2000 | Becker et al. |
| 6,173,567 B1 | | 1/2001 | Poola et al. |
| 6,192,688 B1 | | 2/2001 | Beebe |
| 6,325,002 B1 | * | 12/2001 | Ashworth .................... 110/345 |
| 6,471,506 B1 | * | 10/2002 | Zamansky et al. ............. 431/4 |

OTHER PUBLICATIONS

Argonne National Laboratory, Engine and Vehicle Systems Research, Winter 1999.
Techno Trend/Science & Technology Profiles/Ultra Low $No_x$ Compact Boiler Using Metal Fiber Burner, Feb. 20, 2001, pp. 1–3.
DOE Fossil Energy Techline, Feb. 18, 2000.
DOE Fossil Energy Techline, Oct. 14, 1996.
Internal Combustion Engines & Air Pollution, E. F. Obert, 1973.
Boilers and Burners, Design and Theory, P. Basu et al, 2000.

* cited by examiner

Primary Examiner—Alfred Basichas
(74) Attorney, Agent, or Firm—Eddie E. Scott; Alan H. Thompson; L. E. Carnahan (57) ABSTRACT

Multi-stage combustion technology combined with nitrogen-enriched air technology for controlling the combustion temperature and products to extend the maintenance and lifetime cycles of materials in contact with combustion products and to reduce pollutants while maintaining relatively high combustion and thermal cycle efficiencies. The first stage of combustion operates fuel rich where most of the heat of combustion is released by burning it with nitrogen-enriched air. Part of the energy in the combustion gases is used to perform work or to provide heat. The cooled combustion gases are reheated by additional stages of combustion until the last stage is at or near stoichiometric conditions. Additional energy is extracted from each stage to result in relatively high thermal cycle efficiency. The air is enriched with nitrogen using air separation technologies such as diffusion, permeable membrane, absorption, and cryogenics. The combustion method is applicable to many types of combustion equipment, including: boilers, burners, turbines, internal combustion engines, and many types of fuel including hydrogen and carbon-based fuels including methane and coal.

10 Claims, 3 Drawing Sheets

MULTI-STAGE COMBUSTION USING NITROGEN-ENRICHED AIR

RELATED APPLICATION

This application relates to U.S. Provisional Application No. 60/332,234 filed Nov. 20, 2001 and claims priority thereof.

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to combustion systems, particularly to increasing the efficiency of combustion systems while simultaneously reducing polluting exhaust emissions, and more particularly to a combustion system which combines multi-stage combustion technology with nitrogen-enriched air technology.

Increasing fuel efficiency in combustion engines while simultaneously reducing polluting exhaust emissions has been researched over the past 25 years and subsidized by the Federal Government. Maximum fuel efficiency normally occurs at or near stoichiometric conditions where the fuel is completely oxidized. In practice, the combustion process in an engine is usually with air and not with pure oxygen. When oxygen is supplied by dry air, 3.76 moles of nitrogen will accompany one mole of oxygen. The stoichiometric air-fuel ratio is the ratio of the mass of air to the mass of fuel to result in stoichiometric combustion. The actual operating condition of an engine is usually expressed in terms of the equivalence ratio, which is the ratio of the stoichiometric air-fuel ratio to the actual air-fuel ratio. The equivalence ratio is 1.0 when the engine is operating at stoichiometric conditions. When an engine operates at an equivalence ratio greater than 1.0, it is operating fuel rich and produces pollutants such as hydrocarbons (HC), carbon monoxide (CO) and particulate matter. At equivalence ratios less than 1.0, the engine produces oxides of nitrogen ($NO_x$) which is major source of photochemical smog and is regulated. Also, the combustion gases can be very corrosive with the excess oxygen and reduce the life of the engine.

Past research developed efficient engines by operating with equivalence ratios less than one, but will not meet impending requirements for greatly reduced $NO_x$. Current research includes the development or modification of engines such as Variable Compression, Homogenous Charged Compression Ignition (HCCI), Clean Energy System (CES), Gasoline Injection and nitrogen augmentation or enriched air combustion. Emissions can also be reduced using catalytic converters for spark-ignited engines or using the Plasma-Assisted Catalytic Reduction (PACER) process for lean-burn engine.

Figure 1:
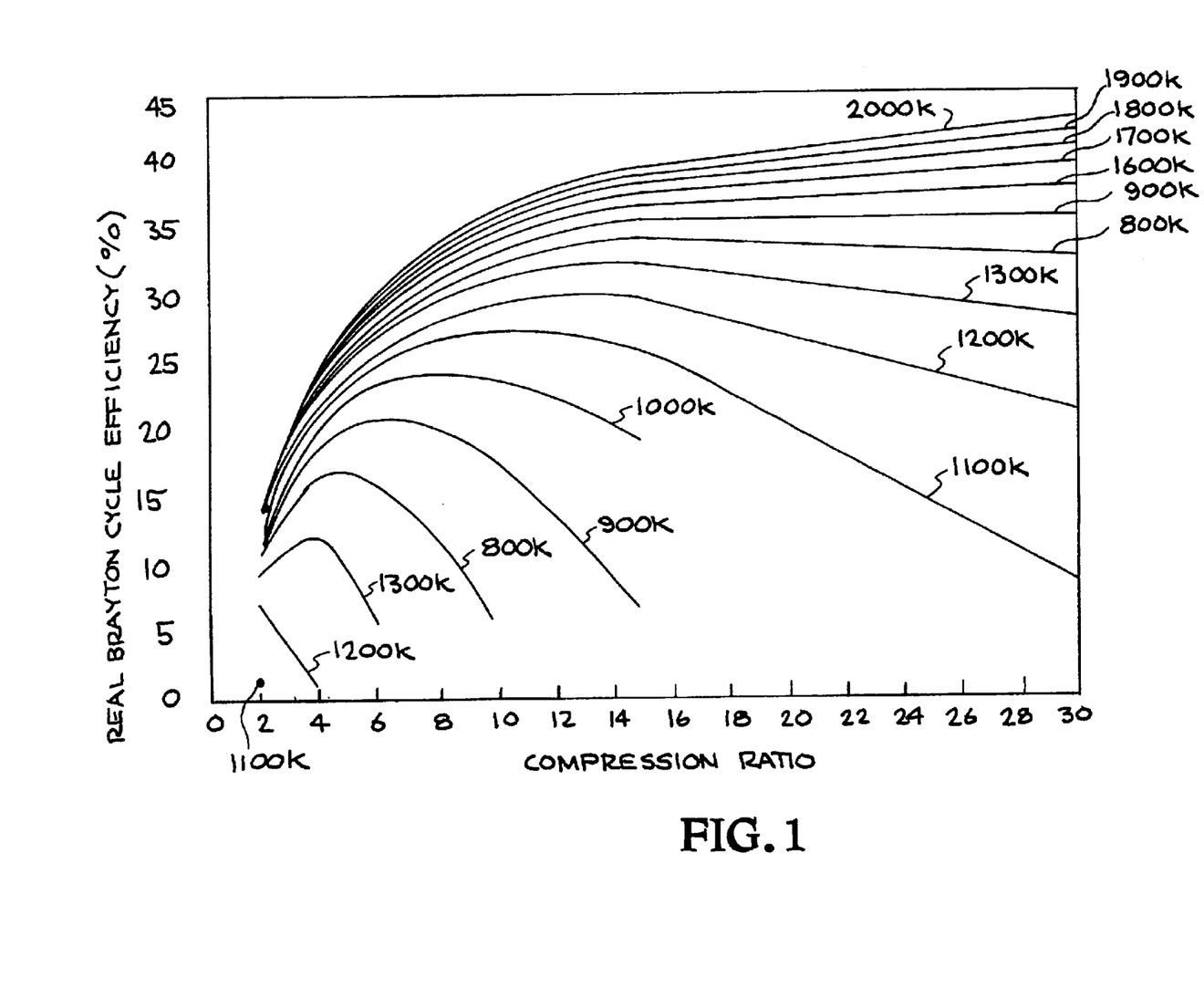
FIG. 1 illustrates the Brayton Cycle efficiency at various temperatures.

By increasing the combustion temperature and pressure, the efficiency of a combustion system can usually be increased. As shown in FIG. 1, the efficiency of the Brayton cycle generally increases with temperature and pressure, but can decrease with pressure when the temperature is too low. Hence, it is important to operate at the highest temperature as possible to obtain high efficiency. The maximum operational temperature of most combustion systems, especially continuous flow ones, is limited by the materials of construction and the corrosive and oxidative products of combustion. In general, higher operational temperatures decrease the materials physical properties (e.g., strength) and increase corrosion and oxidation of the material.

Typically, gas turbines operate with excess air ($\Phi=0.4$–$0.7$) to reduce the operational temperature but produces large amounts of corrosive and oxidative gases. A two-staged turbine can be used to reduce the corrosive and oxidative gases by burning fuel rich in the first stage and stoichiometrically in the second stage. However, in order to obtain acceptable combustion temperatures in the first stage, the fuel ratio tends to be excessively high which can result in soot formation and fouling.

Another approach to reduce the combustion temperature is to use nitrogen augmentation or enriched air. Air separation technologies are used to enrich nitrogen in air up to 100%. To obtain reasonably high efficiency, the fuel and nitrogen enriched air are combusted in a single stage at stoichiometric conditions which requires relatively large amounts of highly enriched nitrogen oxidant.

The problem of increasing fuel efficiency while reducing emissions should be solved because it affects energy consumption and the environment. The present invention provides a solution to this problem wherein multi-stage combustion technology is combined with nitrogen-enriched air technology. In the combustion system of the present invention, the first stage of combustion operates fuel rich where most of the heat of combustion is released by burning the fuel with nitrogen-enriched air. Part of the energy in the combustion gases is used to perform work or to provide heat. The cooled combustion gases are reheated by additional stages of combustion until the last stage is at or near stoichiometric conditions. Additional energy is extracted from each stage to result in relatively high thermal cycle efficiency.

SUMMARY OF THE INVENTION

It is an object of the present invention to increase fuel efficiency in combustion systems while simultaneously reducing polluting exhaust emissions.

A further object of the invention is to provide a combustion system which controls the combustion temperature and products so as to extend the maintenance and lifetime cycles of materials in contact with the combustion products and reduce pollutants while maintaining relatively high combustion and thermal cycle efficiencies.

Another object of the invention is to combine multi-stage combustion technology with nitrogen-enriched air technology.

Another object of the invention is to provide a multi-stage combustion system using nitrogen-enriched air.

Another object of the invention is to provide a multi-stage combustion system wherein the first stage of combustion operates fuel rich, wherein part of the energy in the combustion gases is used to perform work or to provide heat, and wherein the cooled combustion gases are reheated by at least one additional stage of combustion until the last stage is at or near stoichiometric conditions.

Other objects and advantages of the present invention will become apparent from the following description and accompanying drawing. The invention is a multi-stage combustion system using nitrogen-enriched air. The combustion system of this invention can increase fuel efficiency while simultaneously reducing polluting exhaust emissions. For example, a two-stage turbine can be used to reduce the corrosive and oxidative gases by burning fuel rich in the first stage and stoichiometrically in the second stage, with the combustion temperature being reduced by the use of nitrogen augmentation or enriched air. By operating the first stage of combustion by burning the fuel with nitrogen-enriched air, most of the heat of combustion is released in the burning process, part of the energy in the combustion gases being used to perform work or to provide heat, and the cooled combustion gases are reheated by additional stages of combustion until the last stage is at or near stoichiometric conditions. Additional energy is extracted from each stage to result in relatively high thermal cycle efficiency. The air is enriched with nitrogen using air separation technologies such as diffusion, premeable membrane, absorption, and cryogenics. The invention has application for various types of combustion systems including turbines, boilers, furnaces, as well as combustion engines, and various types of fuels can be utilized including hydrogen, coal, methane, and various other carbon-based fuels.

BRIEF DESCRIPTION OF THE DRAWINGS

The accompanying drawings which are incorporated into and form a part of the disclosure, illustrate embodiments of the invention and, together with the description, serve to explain the principles of the invention.

DETAILED DESCRIPTION OF THE INVENTION

The present invention is directed to multi-stage combustion using nitrogen-enriched air. The combustion approach of this invention results in lower pollutant emissions, lower corrosion rates of combustion and heat-transfer equipment, and comparable or improved efficiencies as compared to the typical combustion process used in boilers, burners, turbines, and internal combustion engines. This combustion approach combines the technologies of stage-combustion with the use of nitrogen-enriched air for the oxidant stream in one or more of the combustion stages.

The high oxidant loading in the effluent from many combustion processes facilitates large corrosion rates in the related combustion and process equipment, especially the equipment that is in contact with high-temperature effluent. The high oxidant concentration typically results from the single-stage burning of fuel "lean" (more than the stoichiometric amount of air) to control the combustion temperature, the corrosion rate, and the production of pollutants. The monatomic oxygen formed, which is much higher when fuel is burned oxidant-rich (fuel-lean), is particularly corrosive. For boilers and burners fired with sulfur-containing fuel, a reduction in the effluent oxygen concentration should reduce the formation of $SO_3$ and the associated corrosion of the iron oxide layer (to form atomic iron and sulfate ion) on heat transfer equipment, especially in the superheater and other surfaces above 823K. Additionally, a low-oxygen concentration in the effluent can help with the oxidation of vanadium to vanadium trioxide instead of the much more corrosive pentoxide.

The combustion system of this invention involves burning fuel in two or more stages in a combustion system, where the fuel is combusted fuel-rich with nitrogen-enriched air in the first stage, and then the fuel remaining after the first combustion stage is burned in the remaining stage(s) with air or nitrogen-enriched air. (see FIG. 2). All the combustion stages, except the last have a slightly rich fuel/oxidant mixture, and the last stage has a stoichiometric (or near stoichiometric) fuel/oxidant mixture. Following each combustion stage, part of the energy from the combustion gases is used to perform work or to provide heat. The equivalency ratio for the first stage of combustion and the nitrogen-enriched air are adjusted to achieve the desired combustion temperature and reduced corrosion and pollutant levels. The equivalency ratio and nitrogen enrichment concentration ranges are respectively typically, $\Phi=1.1–1.5$ and 81–88%. This method of burning fuel substantially reduces the oxidant (i.e., $O_2$ and O) and pollutant levels (i.e., NO and CO) in the effluent and, thus, allow higher operational temperatures to maintain or increase the thermal efficiency. This combustion method is applicable to many types of combustion systems, including boilers, burners, turbines, internal combustion engines, and many types of fuel including hydrogen and carbon-based fuels. Application of SCNEA to a two stage gas turbine combustion system cycle is shown schematically in FIG. 3. First, air is enriched in nitrogen using air separation technology and then compressed in a water-cooled compressor to 30 atmospheres. The nitrogen enriched air enters the first stage combustion chamber where it is mixed with fuel and burns fuel rich. The combustion gases exit the combustion chamber and enters a turbine at the combustion temperature of 1700K and the pressure of 30 atmospheres. Work is performed in the turbine by expansion of the gases to a temperature of 780K and a pressure of 2 atmospheres. The cooled combustion gases enter the second stage where nitrogen-enriched air or air is added to burn the remaining fuel in the second stage. The nitrogen-enriched air or air is supplied by a compressor and heated in a heat exchanger by the second stage exhaust gases.

The invention can be utilized for low-pollutant, low-corrosion, high-efficiency combustion of low-sulfur coal in boilers and furnaces, as well as the combustion of methane in turbines.

Figure 2:
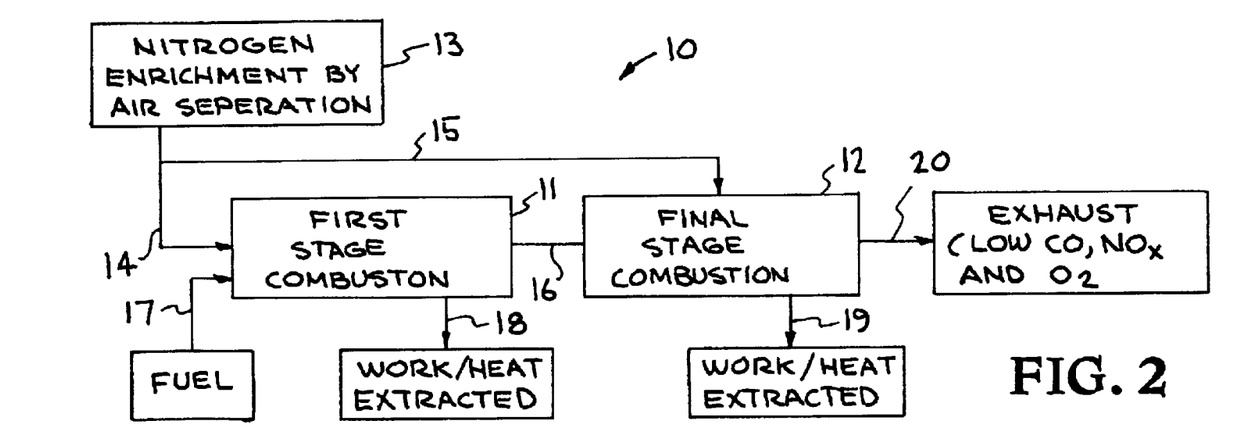
FIG. 2 schematically illustrates a multi-stage combustion system using nitrogen-enriched air in accordance with the present invention.

Referring now to FIG. 2, the multi-stage combustion system of the invention, generally indicated at 10, comprises a first stage combustion section 11, a final stage combustion section 12, each connected to a nitrogen enrichment air separation section 13, as indicated by arrow 14 and 15, with arrow 15 being partially dotted to enable insertion of any number of desired additional combustion sections, with a dotted line 16 intermediate the combustion sections 11 and 12. Fuel, indicated by arrow 17, is supplied to the first stage combustion section 11, with work/heat being extracted from combustion sections 11 and 12 as indicated by arrows 18 and 19, and with an exhaust from combustion section 12 as indicated by arrow 20, which may be, for example, low CO, $NO_x$, and $O_2$.

Analytical verification of the invention has been carried out relative to combustion of methane in turbines and the combustion of low-sulfur coal in boilers, each using nitrogen-enriched air for the oxidant stream in the first stage.

The equilibrium reaction products (and thermodynamic values for the reaction, i.e., $\Delta H$) are calculated using the computer code FACT. All the combustion reactions were determined for $\Delta H=0$, which corresponds to no heat loss by the system. The combustion calculations were performed by assuming in initial temperature, a constant pressure, no heat loss, and the final temperature and equilibrium reaction products were determined with the computer code. The fraction nitrogen in the nitrogen-enriched air was adjusted to achieve a desired final temperature for the first combustion stage.

The use of the invention in a two-stage turbine is described followed by a description of the two-staged combustion of low-sulfur coal in a boiler. The staged combustion nitrogen-enriched air combustion system of this invention is referred to herein after as the SCNEA method.

The two-stage turbine cycle was modeled as an ideal Brayton cycle, where the first compression stage is water cooled and the oxidant stream for the second combustion stage is preheated in a heat exchanger by the hot effluent gases from the second turbine. The thermodynamic calculations for the two-stage turbine cycle (ideal Brayton cycle) were performed using the computer code CyclePad, where the gas was standard air.

In the two-stage turbine cycle, the first compressor feed would consist of nitrogen-enriched air mixed with the fuel (methane for our example) at 300K and a pressure of one atmosphere. The first compressor compresses the gas mixture to the desired pressure (this compression increases the gas temperature). The mixture is then combusted at a constant pressure. Nitrogen-enriched air is used as the oxidant stream in the first combustion stage to allow precise control of the combustion temperature (and correspondingly the pollutant generation) while producing effluent gases that have a very low oxidant loading. The combustion products at high temperature and an elevated pressure are expanded to 2.0 atmospheres and work is extracted (this expansion results in a lowering of the gas temperature). Since the first combustion stage is operated fuel-rich ($\Phi>1$), there is enough fuel remaining in the effluent from the first combustion stage to be flammable when mixed with a stoichiometric amount of air (or nitrogen-enriched air). This mixture is combusted at a constant pressure of 2.0 atmospheres in the second combustion stage. The temperature of the second combustion stage is maintained below the temperature of the first combustion stage by controlling the amount of fuel remaining after the first combustion stage. The effluent from the second combustion stage is then expanded to 1.0 atmospheres and work is again extracted. See FIG. 3 for a diagram of the thermodynamic cycle used to model a two-stage turbine cycle.

The thermodynamic cycle of compression-combustion-expansion is the Brayton cycle. For the ideal Brayton cycle, the compression and expansion (turbine) stages are assumed to be adiabatic and isentropic, and the combustion stage is assumed to be isobaric. The efficiency of the Brayton cycle can be increased sometimes by increasing the maximum pressure. However, if the temperature is too low, an increase in pressure can result in a decrease in efficiency. See FIG. 1 for a plot of the real Brayton cycle efficiency as a function of pressure for various temperatures.

From FIG. 1, it is clear that if the compression ratio is above 15, the temperature should be at least 1400K. The low oxidant loading in the effluent when using the SCNEA method allow both higher temperatures and higher pressures without increasing corrosion rates over those of typical combustion facilities. These allowable increases in temperature and pressure, when using SCNEA method, lead to higher Brayton cycle efficiencies.

Figure 3:
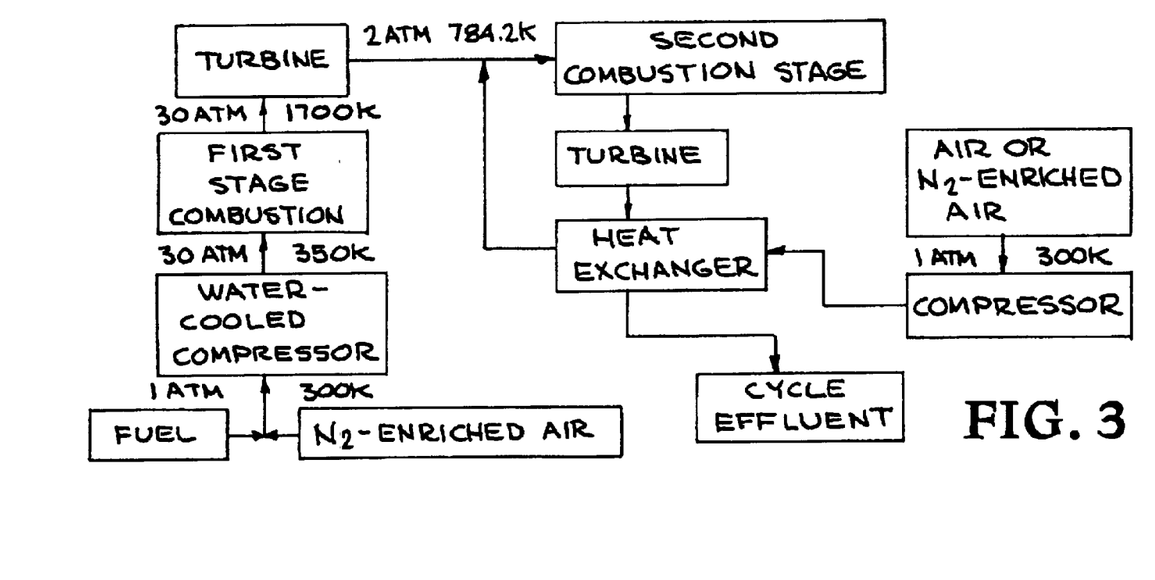
FIG. 3 illustrates a typing multi-stage gas turbine system utilizing the multi-stage combustion with nitrogen-enriched air in accordance with the invention.

The SCNEA of methane in the two-stage turbine cycle, as shown in FIG. 3, is described below for each unit operation. Also, described hereinafter is the SCNEA of methane in a single-stage turbine cycle.

First Fuel/Oxidant Mixing Stage:

The fuel, methane in this example, at 300K is mixed with nitrogen-enriched air at 300K in the first mixing stage at a pressure of one atmosphere.

First Compression:

The nitrogen-enriched air and methane mixture is input to the compressor at 300K and 1.0 atmosphere. The compressor increases the pressure of the gas mixture to 30 atmospheres, and because the compressor is assumed to be water-cooled, the compressed gas is assumed to exit the compressor at a temperature of 350K.

First Combustion Stage:

The methane and nitrogen-enriched air mixture at 30 atmospheres and 350K is input to the first combustion chamber where most of the methane is burned and the temperature is increased to 1700K.

The relative amount of fuel and air in the combustion mixture is described by $\Phi$, the ratio of mass fuel to mass air divided by the ratio of mass fuel to mass air for a stoichiometric mixture [i.e., (Mass Fuel/Mass Air)/(Mass Fuel/Mass Air)$_s$]. For $\Phi>1$, the mixture is fuel-rich and for $\Phi<1$, the mixture is fuel-lean. The combustion temperature as a function of the mole percent nitrogen in the nitrogen-enriched air for various values of $\Phi$ have been plotted but not shown herein.

It is important to ensure that the gas mixture anticipated for the first combustion stage is flammable. The flammability limits for nitrogen-air-methane mixtures at room temperature and atmospheric pressure have been plotted. The percent excess nitrogen ([$N_2$(ex)/[$N_2$(ex)+$N_2$(air)+$O_2$(air)+$CH_4$]]*100%) has been plotted versus the percent methane ([$CH_4$/[($N_2$(ex)+$N_2$(air)+$O_2$(air)+$CH_4$]]*100%). Mixture compositions that fall to the left of a solid line were flammable and mixture compositions that fall to the right of that solid line were non-flammable.

Various fuel/oxidant mixtures, their corresponding $\Phi$-values, their corresponding excess nitrogen percentages, their corresponding percent nitrogen values, and the corresponding mole percent of fuel remaining after the first combustion stage are given in Table 1. For a final temperature of 1700K, mixtures with less than about 35% excess nitrogen are flammable (at 300K and 1 atm). This indicates that a stoichiometric mixture case 6 may not be flammable, and that mixtures for cases 1–4 would be flammable. As a conservative approach to insure flammability of the fuel/oxidant mixture, the flammability limits at room conditions are applied to the input conditions of the first combustion stage, when actually an increase in temperature and pressure would expand and widen the flammability envelope.

For Cases #1–4 in Table 1 ($\Phi$=1.33–1.111), the mole percent fuel remaining after the first combustion is from 7.33% to 2.67%. Since the fuel components remaining in the effluent from the first combustion stage are mainly hydrogen and carbon monoxide, a reasonable flammability limit is about 4%. For this flammability limit, the mixtures for Cases #1–3 are appropriate for the example of SCNEA in a two-staged turbine cycle. Additionally, since the final temperature of the second stage combustion increases (and correspondingly the pollutant generation i.e., NO and CO) with $\Phi$, it is desirable to minimize $\Phi$ while still allowing the gas mixture entering the second combustion stage to be flammable. Therefore, a $\Phi$ of 1.176 (Case #3), which corresponds to a mole percent fuel remaining after the first combustion of 4.2%, is close to the best choice for operation of a two-staged turbine cycle since SCNEA. In the following sections of this example, details of the reaction products and the turbine cycle attributes for the mixture described by Case #3 in Table 1 is addressed.

TABLE 1

Various fuel/oxidant stream mixtures and their corresponding percent nitrogen excess, percent nitrogen in nitrogen-enriched air, Φ-value, and the mole percent fuel remaining after the first combustion. ($T_i$ = 350K, $T_f$ = 1700K, $P_i = P_f$ = 30 atm)

| Case # | $CH_4$ (mol) | $O_2$ (air) (mol) | $N_2$ (air) (mol) | $N_2$ (total) (mol) | $N_2$ (excess) (mol) | Percent $N_2$ (excess) (%) | Percent $N_2$ In $N_2$-Enriched Air (%) | Φ | Mole % fuel Remaining After 1st Combustion (%) |
|---|---|---|---|---|---|---|---|---|---|
| 1 | 1 | 1.5 | 5.643 | 8.559 | 2.916 | 26.37 | 85.09 | 1.333 | 7.33 |
| 2 | 1 | 1.6 | 6.019 | 9.650 | 3.631 | 29.64 | 85.78 | 1.250 | 5.76 |
| 3 | 1 | 1.7 | 6.395 | 10.748 | 4.353 | 32.37 | 86.34 | 1.176 | 4.20 |
| 4 | 1 | 1.8 | 6.771 | 11.852 | 5.081 | 34.67 | 86.81 | 1.111 | 2.67 |
| 5 | 1 | 1.9 | 7.148 | 12.962 | 5.814 | 36.66 | 87.21 | 1.053 | 1.25 |
| 6 | 1 | 2 | 7.524 | 14.058 | 6.5342 | 38.31 | 87.54 | 1.000 | 0 |
| 7 | 1 | 3.3445 | 12.582 | 12.582 | 0 | 0 | 79.00 | 0.598 | 0 |

First Expansion Stage:

The first expansion stage consists of expanding the products of the first combustion stage, which are at 1700K and 30 atmospheres, to a pressure of two atmospheres. For an isentropic and adiabatic expansion of air at 1700K and 30 atmospheres to a pressure of 2 atmospheres, the final gas temperature is 784.2K.

Second Compression Stage

The air stream for the second combustion stage is adiabatically and isentropically compressed from a temperature of 300K and a pressure of one atmosphere to a pressure of two atmospheres. This compression results in a final gas temperature of 365.7K. This gas at 2 atmospheres and 365.7K is then passed through a heat exchanger where it is isobarically heated to a temperature of 784.2K with the effluent from the second turbine.

Second Fuel/Oxidant Mixing Stage:

The air at a pressure of two atmospheres and a temperature of 784.2K is mixed with the effluent from the first combustion stage, which is also at a pressure of two atmospheres and a temperature of 784.2K.

Second Combustion Stage:

The flammable gas mixture at a pressure of 2 atmospheres and a temperature of 784.2K is combusted at a constant pressure in the second combustion stage. The final temperature of the second combustion stage is dependent upon the amount of fuel remaining after the first combustion stage. The Φ for the gas mixture input to the first combustion stage is related to the temperature of the second combustion stage. The higher the Φ-value (for Φ>1) for the first combustion stage, the more fuel will remain after the first combustion stage (see table 4.1), and the higher the final temperature of the second combustion stage.

For our example with Φ=1.176 for the first combustion stage, the final temperature of the second combustion stage is 1093.7K.

Second Expansion Stage:

The hot gases from the second combustion stage are isentropically and adiabatically expanded from a pressure of two atmospheres to a pressure of one atmosphere in the second turbine. This expansion results in a lowering of the gas temperature.

For our example with Φ=1.176, the gas temperature is reduced to 897.2 when it is expanded to a pressure of one atmosphere. This gas from the second expansion stage is passed through a heat exchanger (to heat the input air to the second combustion stage from 365.7K to 784.2K) before being released to the environment.

Emissions and Brayton Cycle Results for the SCNEA of Methane in a Two-Staged Turbine Cycle:

The emissions of pollutants and oxidizing gases from SCNEA of methane in a two-staged turbine cycle are as follows: $1.16 \times 10^{-6}$ moles NO per mole $CH_4$ feed ($1.53 \times 10^{-11}$ kg NO per BTU); $1.95 \times 10^{-6}$ moles CO per mole $CH_4$ feed ($2.4 \times 10^{-11}$ kg CO per BTU); and $2.33 \times 10^{-6}$ moles oxygen (O plus $O_2$) per mole $CH_4$ feed.

For a feed rate of 1 kg/s (methane+nitrogen-enriched air), the ideal two-staged Brayton cycle with a water-cooled first compressor and a heat exchanger to heat the input air to the second combustion chamber with the effluent from the second turbine produces a net power of 819.8 kW. Since the ratio of the real Brayton cycle efficiency to the ideal Brayton cycle efficiency is 0.699 for the compression pressures in this example, the real Brayton cycle net power is 573.0 kW. Since there is an energy cost for producing the nitrogen-enriched air, this "energy cost" must be subtracted from the net power. From vendor information, the energy cost for producing the nitrogen-enriched air is about 150 kW per kilogram of excess nitrogen. Therefore, considering the energy cost of the nitrogen-enriched air, the real Brayton cycle net power is 560.2 kW. Since the mass fraction of the methane in the feed was $4.309 \times 10^{-2}$, the real Brayton cycle net power per mass methane is $1.30 \times 10^4$ kW/kg $Ch_4$.

Single-Stage Turbine Cycle Using Nitrogen-Enriched Air for the Oxidant Stream

In this section, a single-stage methane-burning turbine cycle where the oxidant stream is nitrogen-enriched air is examined. For this analysis, the operating pressures and temperatures are the same as those for the first stage of the two-stage turbine cycle, i.e., (1) fuel/oxidant mixture is input to the compressor at 300K and one atmosphere, (2) gases exiting the water cooled compressor are at 350K and 30 atmosphere, and (3) the final temperature of the combustion is 1700K.

Since there is one combustion stage, the fuel/oxidant mixture should be at or near the stoichiometric (Φ=1) composition (see Case #6, Table 1) to ensure that the fuel consumption is as complete as possible. The hot effluent gases (P=3-atm, T=1700K) are expanded to one atmosphere. This expansion reduces the gas temperature to 643.3K.

The emissions of pollutants and oxidizing gases from the single-stage combustion of methane using nitrogen-enriched air in a single-staged turbine cycle are as follows: $8.41 \times 10^{-4}$ moles NO per mole $CH_4$ feed ($1.42 \times 10^{-8}$ kg NO per BTU); $1.72 \times 10^{-3}$ moles CO per mole $CH_4$ feed ($2.7 \times 10^{-8}$ kg CO per BTU); and $8.6 \times 10^{-4}$ moles oxygen (O plus $O_2$) per mole $CH_4$ feed.

For a single stage turbine cycle burning methane with nitrogen-enriched air, the ideal Brayton cycle net power is 744.0 kW. Since the ratio of the real Brayton cycle efficiency to the ideal Brayton cycle efficiency for this case is 0.6413, the real Brayton cycle net power is 477.1 kW. Adjusting for the energy cost of enriching the air with nitrogen at a rate of Summary Brayton Cycle and Effluent Results for SCNEA of Methane in Turbines:

The summary effluent and Brayton cycle results for: (1) single-stage turbine cycle burning methane with excess air; (2) single-stage Brayton cycle burning methane with nitrogen-enriched air; and (3) two-stage Brayton cycle burning methane with nitrogen-enriched air in the first stage at $\Phi=1.176$ and burning the remaining fuel in the second-stage with stoichiometric air are given in Table 2.

TABLE 2

Summary effluent and fuel efficiency results for one- and two-stage Brayton cycles

| Cycle Description | # Stages | FEED | | | $\Phi$ | Effluent | | | Power |
| --- | --- | --- | --- | --- | --- | --- | --- | --- | --- |
| | | $CH_4$ (mole) | $O_2$ (mole) | $N_2$ (mole) | | NO (kg NO/BTU) | CO (kg CO/BTU) | O & $O_2$ (moles O & $O_2$/mole $CH_4$) | Efficiency (kW/kg $CH_4$) |
| Single/stage w/ Excess air | 1 | 1.0 | 3.3445 | 12.582 | 0.6 | $1.9 \times 10^{-7}$ | $6.9 \times 10^{-10}$ | 1.33 | $1.43 \times 10^4$ |
| Single/stage w/ $N_2$-enriched air | 1 | 1.0 | 2.0 | 14.058 | 1.0 | $1.42 \times 10^{-8}$ | $2.7 \times 10^{-8}$ | $8.6 \times 10^{-4}$ | $1.24 \times 10^4$ |
| Two-staged w/ $N_2$-enriched air (SCNEA) | 2 | 1.0 | 1.7 | 10.748 | 1.176, 1.0 | $1.53 \times 10^{-11}$ | $2.4 \times 10^{11}$ | $2.33 \times 10^{-6}$ | $1.30 \times 10^4$ |

150 kW per kilogram of excess nitrogen, the adjusted net power for the real Brayton cycle is 419.2 kW. Then, with a mass fraction of methane in the feed of $3.378 \times 10^{-2}$, the real Brayton cycle net power as a function of mass methane is $1.24 \times 10^4$ kW/kg $CH_4$.

Single-Stage Turbine Cycle Using Excess Air for the Oxidant Stream:

In this section, a single-stage methane-burning turbine cycle where the oxidant stream is air is examined. For this analysis, the operating pressures and temperatures are the same as those for the first stage of the two-stage turbine cycle, i.e., (1) fuel/oxidant mixture is input to the compressor at 300K and one atmosphere, (2) gases exiting the water cooled compressor are at 350K and 30 atmospheres, and (3) the final temperature of the combustion is 1700K.

For this case, the fuel/air mixture must be very fuel-lean (excess air) to maintain a final combustion temperature of 1700K. The mixture composition has a $\Phi$ of about 0.6 (see Case #7 in Table 1). The hot effluent gases (P=30 atm, T=1700K) are expanded to one atmosphere. This expansion reduces the gas temperature to 643.3K.

The emissions of pollutants and oxidizing gases from the single-stage combustion of methane using excess air in a single-staged turbine cycle are as follows: $1.13 \times 10^{-2}$ moles NO per mole $CH_4$ feed ($1.9 \times 10^{-7}$ kgNO per BTU); $4.37 \times 10^{-5}$ moles CO per mole $CH_4$ feed ($6.9 \times 10^{-10}$ kg CO per BTU); and 1.33 moles oxygen (O plus $O_2$) per mole $CH_4$ feed.

For a single-stage cycle burning methane with excess air, the ideal Brayton cycle net power is 749.2 kW for a feed (methane+nitrogen-enriched air) rate of 1 kg/s. For this case, the ratio of the real Brayton cycle efficiency to the ideal Brayton cycle efficiently is 0.6413, and the real Brayton cycle net power is 480.4 kW. Since the mass fraction of the methane in the feed is $3.366 \times 10^{-2}$, the real Brayton cycle net power as a function of the mass methane is $1.43 \times 10^4$ kW/kg $CH_4$.

As shown in Table 2, the single-stage cycle using nitrogen-enriched air produces over 10 times less NO and over 1000 times less oxidant in the effluent with a decrease in fuel efficiency of 13.3% as compared to the single-stage cycle using excess air. Therefore, the decrease in NO and oxidant in the effluent has a cost of 13.3% less fuel efficiency. This decrease in fuel efficiency may be overcome in practice, however, since the single-stage cycle using nitrogen-enriched air can be operated at a higher temperature than the single-stage cycle with excess air with no appreciable increase in corrosion (due to the decreased oxidant loading for the single-stage cycle with nitrogen-enriched air) and obtain a corresponding increase in efficiency.

The SCNEA of methane in a two-staged turbine cycle provides the lowest pollutant and oxidant production rates of the cycles considered. The two-stage cycle using nitrogen-enriched air for the first-stage and air for the second stage produces over 10,000 times less NO, over 10 times less CO, over 500,000 times less oxidant with a decrease in fuel efficiency of 9.1% as compared to the single-stage cycle using excess air. Additionally, the two-stage turbine cycle has better performance than the single-stage turbine cycle using nitrogen-enriched air. The two-stage cycle using nitrogen-enriched air in the first stage produces almost 1000 times less NO, over 1000 times less CO, and over 100 times less oxidants with an increase in fuel efficiency of about 4.8% as compared to the single-stage cycle using nitrogen-enriched air.

Figure 4:
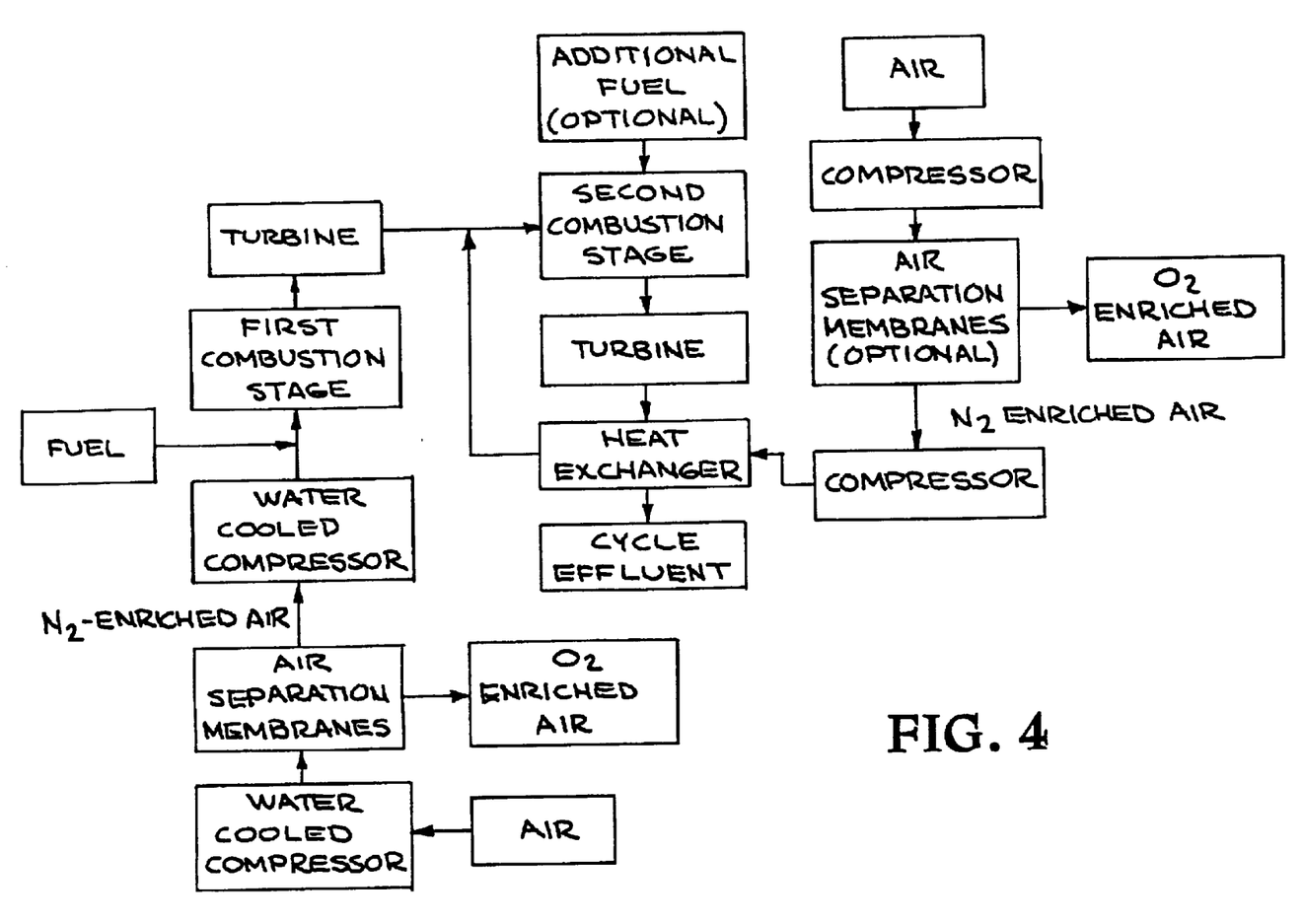
FIG. 4 illustrates an alternate two-stage combustion turbine engine configuration.

An alternate two sage combustion turbine engine configuration is shown in FIG. 4. The air separation is achieved by putting compressed air into a permeable membrane. Nitrogen enrichment occurs as the compressed air flow down the length of the membrane because the oxygen permeates faster through the membrane than nitrogen. The pressure drop for the nitrogen enriched air is about 1–2 psi down the length and hence the process is relatively energy efficient. Another feature also shown in the figure is the injection of fuel into the second stage to ensure that combustion occurs. For similar operating conditions as those shown in FIG. 3, this alternate configuration would have an energy reduction of less than 3.5% compared to a single stage combustion with excess air. The $NO_x$ effluent would be less than 10E–11 kg/btu.

The following demonstrates the benefits of SCNEA by examining the two-staged combustion of low-sulfur coal in a boiler or burner using nitrogen-enriched air for the oxidant stream in the first stage.

For SCNEA in two stages, the first combustion stage is operated slightly fuel-rich so that there is just enough fuel remaining for a second combustion stage. Nitrogen-enriched air is used as the oxidant stream in the first combustion stage, which allows precise control of the combustion temperature (and correspondingly the pollutant generation) while producing effluent gases that have a very low oxidant loading (1,000 times less oxidant loading than fuel burned lean with excess air). The fuel remaining after the first combustion stage (along with the other effluent gases) is mixed with a stoichiometric amount of air and burned in the second stage. The temperature of the second combustion stage is maintained below the temperature of the first combustion stage (by controlling the amount of fuel remaining after the first combustion stage or using nitrogen-enriched air as the oxidant stream).

Two-Staged SCNEA of Coal in a Boiler or Burner:

An Example

First-Stage Combustion:

Consider the combustion of low-sulfur coal in the first stage of a two-stage combustion process. The first combustion stage is operated slightly fuel-rich and the oxidant stream is nitrogen-enriched air. The initial temperature of the feed (oxidant stream and coal) is 300K, the final temperature was chosen as 1800K, and the pressure was assumed constant at 1.2 atmospheres.

The input to the first combustion stage and the products from the first combustion stage (per mole feed) are given in Table 3.1 for three different nitrogen-enrichment levels. The oxidant loadings (O & $O_2$) in the effluent from the first-stage combustion as a function of mole percent nitrogen in the nitrogen-enriched air have been plotted. The relative amount of fuel and air in the combustion mixture is described by $\Phi$, the ratio of mass fuel to mass air divided by the ratio of mass fuel to mass air for a stoichiometric mixture [i.e., (Mass Fuel/Mass Air)/(Mass Fuel Air$_2$). For $\Phi>1$, the fuel-oxidant mixture is fuel-rich and for $\Phi<1$, the fuel-oxidant mixture is fuel-lean. Increasing the nitrogen level in the nitrogen enriched air, decreases the combustion temperature, and the oxidant (O & $O_2$) and pollutant (NO & CO) loading in the effluent gases. Also, increasing $\Phi$ decreases the combustion temperature, and the oxidant (O & $O_2$) and pollutant (NO & CO) loading in the effluent gases.

TABLE 3.1

Input to First-Stage Combustion (300 K, 1.2 atm)

| Case # | $CH_4$ (mol) | $O_2$ (mol) | $N_2$ (mol) | $\Phi$ | % $N_2$ in $N_2$-Enriched Air (%) |
|---|---|---|---|---|---|
| 1 | 1 | 0.632 | 4.181 | 1.158 | 86.9 |
| 2 | 1 | 0.61 | 3.958 | 1.20 | 86.6 |
| 3 | 1 | 0.53 | 3.169 | 1.376 | 85.6 |

If air is used as the oxidant stream in a two-stage coal combustion process where the first stage has a fuel-rich mixture, the fuel-air mixture would need to be extremely fuel-rich to control the combustion temperature at 1800K. For example, the coat/air mixture would require a $\Phi$ of about 2.2 to obtain a combustion temperature of 1800K (initial temperature 300K, pressure 1.2 atm). Burning coal very fuel-rich results in incomplete combustion with soot occurring and undesirable deposition, slagging and fouling. This high $\Phi$-value corresponds to about 50% of the stoichiometric oxidant required for complete combustion. The effect of $\Phi$ on the production of oxidants and pollutants and on the combustion temperature have been plotted for the combustion of low-sulfur coal with air (initial temperature 300K, constant pressure 1.2 atmospheres).

Second-Stage Combustion:

The gaseous effluents from the first combustion stage are mixed with air (or nitrogen-enriched air at the stoichiometric ratio, i.e., $\Phi=1$) and burned in the second combustion stage. The temperature of the effluent gases from the first combustion stage (entering the second combustion stage) depends on how much heat has been extracted from the effluent gases (e.g., to produce steam in the boiler). The final temperature of the second combustion stage (and the resultant oxidant loading in the effluent) depends on the initial temperature and the amount of fuel in the second combustion stage.

For our example, the input gases for the second stage are the product gases from the first-stage combustion of low-sulfur coat (Table 3.2). The final temperature of the second-stage combustion and the oxidant loading in the second-stage effluent gases increases as the input temperature to the second combustion stage increases. Additionally, the final temperature of the second-stage combustion and the oxidant loading of the second-stage effluent gases increases, as $\Phi$ for the first combustion stage increases (more fuel-rich in the first combustion stage, higher combustion temperature in the second combustion stage). This can be understood by observing that as $\Phi$ increases (for $\Phi>1$), the amount of fuel left after the first combustion increases, and the temperature achieved when that residual fuel is burned in the second stage increases.

TABLE 3.1b

Products of First-Stage Combustion of Low-Sulfur Coat at 180 K and 1.2 atmospheres

| Case # | $N_2$ (mol) | NO (mol) | $H_2O$ (mol) | CO (mol) | $H_2$ (mol) | $SO_2$ (mol) | H (mol) | $H_2S$ (mol) | SO (mol) | OH (mol) | HS (mol) | NO (mol) |
|---|---|---|---|---|---|---|---|---|---|---|---|---|
| 1 | 4.508 | 0.476 | 0.273 | 0.147 | $2.25 \times 10^{-2}$ | $1.01 \times 10^{-3}$ | $1.10 \times 10^{-4}$ | $2.86 \times 10^{-6}$ | $3.06 \times 10^{-5}$ | $9.04 \times 10^{-5}$ | $1.58 \times 10^{-4}$ | $2.99 \times 10^{-5}$ |
| 2 | 4.368 | 0.439 | 0.266 | 0.184 | $2.97 \times 10^{-2}$ | $9.93 \times 10^{-4}$ | $1.24 \times 10^{-4}$ | $7.12 \times 10^{-6}$ | $4.07 \times 10^{-5}$ | $7.49 \times 10^{-5}$ | $3.33 \times 10^{-4}$ | $2.10 \times 10^{-5}$ |
| 3 | 3.872 | 0.315 | 0.235 | 0.308 | $6.11 \times 10^{-2}$ | $8.36 \times 10^{-4}$ | $1.63 \times 10^{-4}$ | $8.01 \times 10^{-5}$ | $8.00 \times 10^{-5}$ | $4.22 \times 10^{-5}$ | $2.39 \times 10^{-5}$ | $7.39 \times 10^{-6}$ |

Optimizing $\Phi$ for the SCNEA Method:

The input temperature of the second combustion stage and the $\Phi$-value should be minimized to minimize the oxidant and pollutant loading in the effluent from the second combustion stage. However, the $\Phi$-value should not be too close to one or enough fuel will not remain for the second combustion, NO production will increase, and the oxidant levels in the effluent will increase. The $\Phi$-value should be sufficiently above one so that the fuel remaining after the first combustion stage, when mixed with a stoichiometric amount of air (or nitrogen-enriched air at $\Phi=1$), is above the lower flammability limit. Keeping the final temperature of the second stage combustion lower than that of the first stage combustion requires $\Phi$ be kept less than about 1.3.

The fuel remaining after the first combustion stage is composed predominantly of hydrogen, carbon monoxide, with some sulfur monoxide. A fuel/air mixture at 1000K, where the fuel is mainly CO, $H_2$, and SO, should be flammable when the fuel percentage is about 4 or 5%, which corresponds to a $\Phi$ of about 1.2. (see Table 3.2).

When coal is combusted in the first combustion stage with nitrogen-enriched air at $\Phi=1.2$, enters the second combustion chamber at 1000K, and is combusted in the second combustion chamber with air at $\Phi=1.0$, the final combustion temperature in the second combustion stage is 1237.2K.

TABLE 3.2

Mole percent fuel in second stage combustion mixture as a function of $\Phi$

| $\Phi$ | Mole Percent Fuel in 1st Combustion Effluent |
|---|---|
| 1.158 | 3.3 |
| 1.20 | 4.4 |
| 1.376 | 9.0 |

Results for SCNEA of Low-Sulfur Coal in a Two-Stage Boiler:

The net pollutant and oxidant production when low sulfur coal is combusted in a two-stage boiler using nitrogen-enriched air in the first stage to burn the coal fuel-rich ($\Phi=1.2$) and a stoichiometric amount of air in the second stage are as follows: $8.96 \times 10^{-10}$ kgNO/BTU, $3.69 \times 10^{-10}$ kg CO/BTU, $3.68 \times 10^{-14}$ kgO/BTU, and $5.90 \times 10^{-9}$ kgO$_2$/BTU.

Single-Stage Combustion of Low-Sulfur Coal Using Excess Air:

In single-stage combustion, the fuel is burned nearly completely in one stage. Fuel is not burned rich ($\Phi>1$) in single-stage combustion because it results in incomplete combustion (fuel inefficiency), and the products from incomplete combustion can cause corrosion and scale problems. Single-stage combustion at the stoichiometric mixture of air and fuel results in very high combustion temperatures (>2300K) and high pollution generation levels. To lower the combustion temperature in single-stage combustion, fuel is usually burned lean (excess air, i.e., ($\Phi<1$). Burning fuel lean lowers the combustion temperature, but results in an effluent with high oxidant (O & $O_2$) and pollutant (NO & CO) levels.

When low-sulfur coal (300K) is combusted with air (300K) to give a combustion temperature of 1800K, the coal must be burned very fuel lean ($\Phi=0.6121$). This lean burning with excess air results in an oxidant-rich product stream with $3.43 \times 10^{-5}$ kg $O_2$/BTU(0.4707 moles $O_2$ generated per mole of coal), $6.75 \times 10^{-9}$ kg O/BTU ($1.85 \times 10^{-2}$ moles O generated per mole coal), $1.09 \times 10^{-6}$ kg NO/BTU ($1.59 \times 10^{-2}$ moles NO/mole coal), $2.60 \times 10^{-8}$ kg CO/BTU ($4.07 \times 10^{-4}$ moles CO/mole coal).

Single-Stage Combustion of Low-Sulfur Coal Using Nitrogen-Enriched Air:

When using nitrogen-enriched air in single-stage combustion, the oxygen content in the air is the stoichiometric quantity ($\Phi=1$) and the nitrogen is enriched in the air to control the combustion temperature. This lack of excess oxidant in the feed results in an oxygen-depleted effluent stream with net pollutant oxidant production as follows: $2.03 \times 10^{-7}$ kg NO/BTU ($2.97 \times 10^{-3}$ moles NO/mole coal), $1.46 \times 10^{-7}$ kg CO/BTU ($2.29 \times 10^{-3}$ moles CO/mole coal), $1.19 \times 10^{-9}$ kg O/BTU ($3.27 \times 10^{-5}$ moles O/mole coal), and $1.07 \times 10^{-6}$ kg $O_2$/BTU ($1.47 \times 10^{-2}$ moles $O_2$ generated per mole of coal).

Comparison of LCSL of Low-Sulfur Coal to Other Combustion Methods:

The LCSL of low-sulfur coal is compared to (1) single-stage combustion with excess air, and (2) single-stage combustion with nitrogen-enriched air. The summary results for the oxidant production rates and pollutant generation rates for low-sulfur coal burned using: (1) two-staged SCNEA, (2) single-stage combustion with excess air, and (3) single-stage combustion with nitrogen-enriched air are listed in Table 3.3 for purposes of comparison.

The results in Table 3.3 show that, as compared to the single-stage combustion of coal with excess air, the single-stage combustion of coal with nitrogen-enriched air reduces the $O_2$ production rate by over a factor of 30, the O production rate by over a factor of 5, and the NO production rate by over a factor of 5. Additionally, as compared to the single-stage combustion of coal with excess air, the Two-Stage Low Corrosion Combustion (TSLCC) of coal reduces the $O_2$ generation rate by over a factor of 5800, the O generation rate by over a factor of $1.8 \times 10^5$, the CO generation rate by over a factor of 70, and the NO production rate by over a factor of 1200.

These results clearly show the benefit of the SCNEA of coal in dramatically reducing the oxidant and pollutant loading in the effluent as compared it single-stage combustion with air or with nitrogen-enriched air.

TABLE 3.3

Summary Results For Combustion of Low-Sulfur Coal: (A) Single-Stage Combustion with Excess Air; (B) Single-Stage Combustion with Nitrogen-Enriched Air, and (C) Low-Corrosion Staged Combustion (SCNEA)

| Method | # Stages | Oxidant Stream For 1$^{st}$ Stage | $\Phi$ | Oxidant Stream For 2$^{nd}$ Stage | $O_2$ (kg O2/BTU) | O (kg O/BTU) | NO (kg NO/BTU) | CO (kg CO/BTU) |
|---|---|---|---|---|---|---|---|---|
| A | 1 | Air | 0.612 | -NA- | $3.43 \times 10^{-5}$ | $6.75 \times 10^9$ | $1.09 \times 10^{-6}$ | $2.60 \times 10^{-8}$ |
| B | 1 | N$_2$ Enrich. Air | 1.0 | -NA- | $1.07 \times 10^{-6}$ | $1.19 \times 10^9$ | $2.03 \times 10^{-7}$ | $1.46 \times 10^{-7}$ |

TABLE 3.3-continued

Summary Results For Combustion of Low-Sulfur Coal: (A) Single-Stage Combustion with Excess Air; (B) Single-Stage Combustion with Nitrogen-Enriched Air, and (C) Low-Corrosion Staged Combustion (SCNEA)

| Method | # Stages | Oxidant Stream For $1^{st}$ Stage | Φ | Oxidant Stream For $2^{nd}$ Stage | $O_2$ (kg O2/BTU) | O (kg O/BTU) | NO (kg NO/BTU) | CO (kg CO/BTU) |
|---|---|---|---|---|---|---|---|---|
| C (SCNEA) | 2 | $N_2$ Enrich. Air | 1.2, 1.0 | Air | $5.90 \times 10^{-9}$ | $3.68 \times 10^{14}$ | $8.96 \times 10^{-10}$ | $3.69 \times 10^{-10}$ |

Note:
Initial Temperature was 300 K., Combustion Temperature of first stage was 1800 K., Input Temperature to Second-Stage Combustion (if application) was 1000 K.)

It has thus been shown that the present invention enables control of the combustion temperature and products so as to extend the maintenance and lifetime cycles of materials in contact with combustion products and to reduce pollutants while maintaining relatively high combustion and thermal cycle efficiencies. It has been shown that the invention can be utilized for the combustion of methane in turbines, combustion of low-sulfur coal in burners or boilers, as well as many types of fuel including hydrogen and other carbon-based fuels in any two-stage or multistage applications, including internal combustion engines. Also, it has been shown that the addition of nitrogen-enriched air to single stage combustion systems improves the efficiency. The air is enriched with nitrogen using air separation technologies such as diffusion permeable membrane, absorption, and cryogenics. Potential uses of the invention include replacement/modification of current combustion systems to extend their maintenance and lifetime cycles and to reduce pollutants while maintaining relatively high combustion and thermal efficiencies. The biggest impact of this invention will be with respect to power plants and large vehicles such as trains and ships.

While various embodiments of the invention have been illustrated and or described, with various parameters, etc. set forth that exemplify and teach the principles of the invention, such are not intended to be limiting. Modifications and changes may become apparent to those skilled in the art, and it is intended that the invention be limited only by the scope of the appended claims.

What is claimed is:

1. In a combustion system, the improvement comprising:
   multi-stages of combustion including at least a first stage of combustion and a second stage of combustion,
   means for nitrogen-enriched air injection into said first stage of said multi-stages of combustion,
   means for fuel rich injection into said first stage of said multi-stages of combustion,
   said first stage of combustion producing first stage energy of combustion gases,
   means for work, heat, or work and heat extraction from at least a portion of said first stage energy of combustion gases, and
   means for injecting at least a portion of said first stage energy of combustion gases into said second stage of said multi-stages of combustion.

2. The improvement of claim 1, including means for reheating at least a portion of said first stage energy of combustion gases in said second stage of said multi-stages of combustion and wherein said multi-stages of combustion comprises at least two combustion stages.

3. The improvement of claim 1, wherein said multi-stage of combustion includes a final stage of combustion and including means for reheating at least a portion of said first stage energy of combustion gases in said second stage of said multi-stages of combustion such that said final stage of the combustion is at or near stoichiometric conditions.

4. The improvement of claim 1, including means for nitrogen-enriched air injection into said second stage of said multi-stage of combustion.

5. A combustion method, comprising,
   providing at least two combustion stages,
   directing an amount of nitrogen-enriched air into at least a first of the combustion stages,
   directing fuel in the first of the combustion stages,
   operating the first of the combustion stages under a fuel rich condition,
   using a portion of energy of combustion gases in the first of the combustion stages to perform work or to provide heat,
   reheating cooled combustion gases from the first of the combustion stages in at least another of the combustion stages such that in a final stage of the combustion stages such is at or near stoichiometric conditions.

6. The combustion method of claim 5, additionally including using a portion of energy of the combustion gases in each of the combustion stages to perform work or to provide heat.

7. The combustion method of claim 5, additionally including directing an amount of nitrogen-enriched air into each combustion stage subsequent to the first of the combustion stages.

8. The combustion method of claim 5, additionally controlling direction of the nitrogen-enriched air into each combustion stage subsequent to the first of the combustion stages such that there is a slightly rich fuel/oxidant mixture in each combustion stages except for the last combustion stage which is controlled to have a stoichiometric or near stoichiometric fuel/oxidant mixture.

9. The combustion method of claim 5, additionally controlling the burning of the fuel such that a larger portion is burned in the first of the combustion stages and smaller portions are burned in each subsequent combustion stage.

10. The combustion method of claim 5, additionally including controlling the temperature in each combustion stage such that the temperature decreases in each subsequent combustion stage.

* * * * *